(12) United States Patent
Beauchamp et al.

(10) Patent No.: US 8,402,095 B2
(45) Date of Patent: Mar. 19, 2013

(54) APPARATUS AND METHOD FOR INSTANT MESSAGING COLLABORATION

(75) Inventors: Tim J. Beauchamp, Belmont, CA (US); Geoffrey D. Nicholls, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 33 days.

(21) Appl. No.: 12/039,471

(22) Filed: Feb. 28, 2008

(65) Prior Publication Data

US 2008/0155020 A1   Jun. 26, 2008

Related U.S. Application Data

(62) Division of application No. 10/289,162, filed on Nov. 5, 2002, now Pat. No. 7,401,158.

(60) Provisional application No. 60/410,989, filed on Sep. 16, 2002.

(51) Int. Cl.
  *G06F 15/16* (2006.01)
  *G06F 15/173* (2006.01)
(52) U.S. Cl. .................. 709/206; 709/224
(58) Field of Classification Search ............ 709/206
  See application file for complete search history.

(56) References Cited

U.S. PATENT DOCUMENTS

| | | |
|---|---|---|
| 4,403,286 A | 9/1983 | Fry et al. |
| 5,010,478 A | 4/1991 | Deran |
| 5,033,009 A | 7/1991 | Dubnoff |
| 5,283,894 A | 2/1994 | Deran |
| 5,289,372 A | 2/1994 | Guthrie et al. |
| 5,510,980 A | 4/1996 | Peters |
| 5,544,329 A | 8/1996 | Engel et al. |
| 5,553,215 A | 9/1996 | Kaethler |
| 5,592,608 A | 1/1997 | Weber et al. |
| 5,613,131 A | 3/1997 | Moss et al. |
| 5,615,362 A | 3/1997 | Jensen et al. |
| 5,654,726 A | 8/1997 | Mima et al. |
| 5,717,895 A | 2/1998 | Leedom et al. |
| 5,721,847 A | 2/1998 | Johnson |
| 5,754,774 A | 5/1998 | Bittinger et al. |
| 5,758,337 A | 5/1998 | Hammond |

(Continued)

FOREIGN PATENT DOCUMENTS

WO   WO 01/63466 A2   8/2001

OTHER PUBLICATIONS

Long, Allan Christian et al., "PDA and Gesture Use in Practice: Insights for Designers of Pen-based User Interfaces," University of California at Berkeley, 1997.

(Continued)

*Primary Examiner* — Kenny Lin
*Assistant Examiner* — Gerald Smarth
(74) *Attorney, Agent, or Firm* — Kilpatrick Townsend & Stockton, LLP

(57) ABSTRACT

An apparatus and method for instant message transmission includes a message center coupled to one or more servers and to an event engine by a network. An instant message is transmitted to the message center by the event engine over the network. An algorithm determines the optimum path for the transmission of the instant message. Users may share identical data via instant messaging, and may make changes to the data as it is streamed in real-time to designated users over the network. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b)

15 Claims, 8 Drawing Sheets

U.S. PATENT DOCUMENTS

| | | |
|---|---|---|
| 5,765,164 A | 6/1998 | Prasad et al. |
| 5,778,372 A | 7/1998 | Cordell et al. |
| 5,781,911 A | 7/1998 | Young et al. |
| 5,784,275 A | 7/1998 | Sojoodi et al. |
| 5,787,409 A | 7/1998 | Seiffert et al. |
| 5,809,267 A | 9/1998 | Moran et al. |
| 5,812,840 A | 9/1998 | Schwartz |
| 5,831,609 A | 11/1998 | London et al. |
| 5,831,615 A | 11/1998 | Drews et al. |
| 5,835,721 A | 11/1998 | Donahue et al. |
| 5,857,201 A | 1/1999 | Wright, Jr. et al. |
| 5,862,325 A | 1/1999 | Reed et al. |
| 5,864,669 A | 1/1999 | Osterman et al. |
| 5,881,239 A | 3/1999 | Desgrousilliers |
| 5,890,174 A | 3/1999 | Khanna et al. |
| 5,893,126 A | 4/1999 | Drews et al. |
| 5,893,150 A | 4/1999 | Hagersten et al. |
| 5,898,434 A | 4/1999 | Small et al. |
| 5,918,009 A | 6/1999 | Gehani et al. |
| 5,922,044 A | 7/1999 | Banthia |
| 5,926,177 A | 7/1999 | Hatanaka et al. |
| 5,928,327 A | 7/1999 | Wang et al. |
| 5,930,794 A | 7/1999 | Linenbach et al. |
| 5,943,620 A | 8/1999 | Boltz et al. |
| 5,974,236 A | 10/1999 | Sherman |
| 6,023,694 A | 2/2000 | Kouchi et al. |
| 6,025,844 A | 2/2000 | Parsons |
| 6,031,978 A | 2/2000 | Cotner et al. |
| 6,035,324 A | 3/2000 | Chang |
| 6,038,558 A | 3/2000 | Powers et al. |
| 6,055,548 A | 4/2000 | Comer et al. |
| 6,070,197 A | 5/2000 | Cobb et al. |
| 6,073,242 A | 6/2000 | Hardy et al. |
| 6,075,530 A | 6/2000 | Lucas et al. |
| 6,088,481 A | 7/2000 | Okamoto et al. |
| 6,092,102 A | 7/2000 | Wagner |
| 6,094,681 A | 7/2000 | Shaffer et al. |
| 6,112,236 A | 8/2000 | Dollin et al. |
| 6,125,177 A | 9/2000 | Whittaker |
| 6,141,659 A | 10/2000 | Barker et al. |
| 6,170,019 B1 | 1/2001 | Dresel et al. |
| 6,175,859 B1 | 1/2001 | Mohler |
| 6,182,116 B1 | 1/2001 | Namma et al. |
| 6,185,582 B1 | 2/2001 | Zellweger et al. |
| 6,189,069 B1 | 2/2001 | Parkes et al. |
| 6,201,539 B1 | 3/2001 | Miller et al. |
| 6,204,846 B1 | 3/2001 | Little et al. |
| 6,205,474 B1 | 3/2001 | Hurley |
| 6,208,990 B1 | 3/2001 | Suresh et al. |
| 6,219,042 B1 | 4/2001 | Anderson et al. |
| 6,226,750 B1 | 5/2001 | Trieger |
| 6,233,578 B1 | 5/2001 | Machihara et al. |
| 6,239,797 B1 | 5/2001 | Hills et al. |
| 6,240,444 B1 | 5/2001 | Fin et al. |
| 6,243,698 B1 | 6/2001 | Powers et al. |
| 6,243,713 B1 | 6/2001 | Nelson et al. |
| 6,256,649 B1 | 7/2001 | Mackinlay et al. |
| 6,256,676 B1 | 7/2001 | Taylor et al. |
| 6,260,114 B1 | 7/2001 | Schug |
| 6,269,393 B1 | 7/2001 | Yost et al. |
| 6,292,803 B1 | 9/2001 | Richardson et al. |
| 6,301,601 B1 | 10/2001 | Helland et al. |
| 6,301,609 B1 | 10/2001 | Aravamudan et al. |
| 6,304,546 B1 | 10/2001 | Natarajan et al. |
| 6,314,463 B1 | 11/2001 | Abbott et al. |
| 6,317,737 B1 | 11/2001 | Gorelik et al. |
| 6,336,135 B1 | 1/2002 | Niblett et al. |
| 6,341,312 B1 | 1/2002 | French et al. |
| 6,348,933 B1 | 2/2002 | Walls et al. |
| 6,363,363 B1 | 3/2002 | Haller et al. |
| 6,393,421 B1 | 5/2002 | Paglin |
| 6,397,217 B1 | 5/2002 | Melbin |
| 6,430,576 B1 | 8/2002 | Gates et al. |
| 6,430,604 B1 | 8/2002 | Ogle et al. |
| 6,449,344 B1 | 9/2002 | Goldfinger et al. |
| 6,467,052 B1 | 10/2002 | Kaler et al. |
| 6,480,847 B1 | 11/2002 | Linenbach et al. |
| 6,501,956 B1 | 12/2002 | Weeren et al. |
| 6,510,457 B1 | 1/2003 | Ayukawa et al. |
| 6,513,047 B1 | 1/2003 | Talley |
| 6,519,568 B1 | 2/2003 | Harvey et al. |
| 6,519,601 B1 | 2/2003 | Bosch |
| 6,523,046 B2 | 2/2003 | Liu et al. |
| 6,532,465 B2 | 3/2003 | Hartley et al. |
| 6,535,227 B1 | 3/2003 | Fox et al. |
| 6,542,165 B1 | 4/2003 | Ohkado |
| 6,546,425 B1 | 4/2003 | Hanson et al. |
| 6,567,796 B1 | 5/2003 | Yost et al. |
| 6,567,814 B1 | 5/2003 | Bankier et al. |
| 6,574,618 B2 | 6/2003 | Eylon et al. |
| 6,574,639 B2 | 6/2003 | Carey et al. |
| 6,591,277 B2 | 7/2003 | Spence et al. |
| 6,591,278 B1 | 7/2003 | Ernst |
| 6,598,167 B2 | 7/2003 | Devine et al. |
| 6,606,596 B1 | 8/2003 | Zirngibl et al. |
| 6,640,234 B1 | 10/2003 | Coffen et al. |
| 6,647,272 B1 | 11/2003 | Asikainen |
| 6,651,055 B1 | 11/2003 | Kilmer et al. |
| 6,651,142 B1 | 11/2003 | Gorelik et al. |
| 6,654,790 B2 | 11/2003 | Ogle et al. |
| 6,664,978 B1 | 12/2003 | Kekic et al. |
| 6,668,173 B2 | 12/2003 | Greene |
| 6,678,719 B1 | 1/2004 | Stimmel |
| 6,687,360 B2 | 2/2004 | Kung et al. |
| 6,701,485 B1 | 3/2004 | Igra et al. |
| 6,714,982 B1 | 3/2004 | McDonough et al. |
| 6,731,314 B1 | 5/2004 | Cheng et al. |
| 6,745,193 B1 | 6/2004 | Horvitz et al. |
| 6,766,418 B1 | 7/2004 | Alexander et al. |
| 6,775,267 B1 | 8/2004 | Kung et al. |
| 6,775,298 B1 | 8/2004 | Aggarwal |
| 6,782,424 B2 | 8/2004 | Yodaiken |
| 6,789,083 B2 | 9/2004 | Thelen |
| 6,789,090 B1 | 9/2004 | Miyake et al. |
| 6,792,456 B1 | 9/2004 | Hellerstein et al. |
| 6,807,562 B1 | 10/2004 | Pennock et al. |
| 6,807,583 B2 | 10/2004 | Hrischuk et al. |
| 6,832,341 B1 | 12/2004 | Vijayan |
| 6,839,737 B1 | 1/2005 | Friskel |
| 6,870,830 B1 | 3/2005 | Schuster et al. |
| 6,898,625 B2 | 5/2005 | Henry et al. |
| 6,901,592 B2 | 5/2005 | Mar et al. |
| 6,907,422 B1 | 6/2005 | Predovic |
| 6,915,457 B1 | 7/2005 | Miller |
| 6,920,607 B1 | 7/2005 | Ali et al. |
| 6,937,713 B1 | 8/2005 | Kung et al. |
| 6,938,221 B2 | 8/2005 | Nguyen |
| 6,941,345 B1 | 9/2005 | Kapil et al. |
| 6,941,351 B2 | 9/2005 | Vetrivelkumaran et al. |
| 6,954,757 B2 | 10/2005 | Zargham et al. |
| 6,954,902 B2 | 10/2005 | Noma et al. |
| 6,996,768 B1 | 2/2006 | Elo et al. |
| 7,003,568 B1 | 2/2006 | Chikada et al. |
| 7,003,731 B1 | 2/2006 | Rhoads et al. |
| 7,024,474 B2 | 4/2006 | Clubb et al. |
| 7,028,092 B2 | 4/2006 | MeLampy et al. |
| 7,031,314 B2 | 4/2006 | Craig et al. |
| 7,032,006 B2 | 4/2006 | Zhuk |
| 7,035,923 B1 | 4/2006 | Yoakum et al. |
| 7,058,953 B2 | 6/2006 | Willard et al. |
| 7,089,311 B2 | 8/2006 | Devine et al. |
| 7,096,432 B2 | 8/2006 | Huapaya et al. |
| 7,113,934 B2 | 9/2006 | Levesque et al. |
| 7,113,964 B1 | 9/2006 | Bequet et al. |
| 7,120,139 B1 | 10/2006 | Kung et al. |
| 7,139,797 B1 | 11/2006 | Yoakum et al. |
| 7,171,473 B1 | 1/2007 | Eftis et al. |
| 7,174,339 B1 | 2/2007 | Wucherer et al. |
| 7,177,909 B2 | 2/2007 | Stark et al. |
| 7,188,160 B2 | 3/2007 | Champagne et al. |
| 7,197,565 B2 | 3/2007 | Abdelaziz et al. |
| 7,221,658 B1 | 5/2007 | Armstrong et al. |
| 7,222,294 B2 | 5/2007 | Coffen et al. |
| 7,233,979 B2 | 6/2007 | Dickerman et al. |
| 7,243,124 B1 | 7/2007 | Gardner et al. |
| 7,243,127 B2 | 7/2007 | Tabayoyon, Jr. et al. |
| 7,243,130 B2 | 7/2007 | Horvitz et al. |

| Patent/Pub No. | Date | Name | Ref |
|---|---|---|---|
| 7,269,625 B1 | 9/2007 | Willhide et al. | |
| 7,269,627 B2 * | 9/2007 | Knauerhase | 709/206 |
| 7,272,660 B1 | 9/2007 | Powers et al. | |
| 7,275,215 B2 | 9/2007 | Werndorfer et al. | |
| 7,283,805 B2 | 10/2007 | Agrawal | |
| 7,284,034 B2 | 10/2007 | Matsa et al. | |
| 7,296,217 B1 | 11/2007 | Earnshaw et al. | |
| 7,299,257 B2 | 11/2007 | Boyer et al. | |
| 7,310,532 B2 | 12/2007 | Knauerhase et al. | |
| 7,313,593 B1 * | 12/2007 | Pulito et al. | 709/204 |
| 7,313,617 B2 | 12/2007 | Malik et al. | |
| 7,353,455 B2 | 4/2008 | Malik | |
| 7,359,938 B1 | 4/2008 | Davies et al. | |
| 7,373,428 B1 | 5/2008 | Armstrong et al. | |
| 7,379,963 B1 | 5/2008 | Khare et al. | |
| 7,386,588 B2 | 6/2008 | Mousseau et al. | |
| 7,389,351 B2 | 6/2008 | Horvitz | |
| 7,392,478 B2 | 6/2008 | Aureglia et al. | |
| 7,398,327 B2 | 7/2008 | Lee | |
| 7,401,158 B2 | 7/2008 | Beauchamp et al. | |
| 7,406,569 B2 | 7/2008 | van de Waerdt | |
| 7,412,481 B2 | 8/2008 | Nicholls et al. | |
| 7,412,486 B1 | 8/2008 | Petrack et al. | |
| 7,412,518 B1 | 8/2008 | Duigou et al. | |
| 7,412,645 B2 | 8/2008 | Kotler et al. | |
| 7,415,502 B2 | 8/2008 | Vishik et al. | |
| 7,426,059 B2 | 9/2008 | Broda et al. | |
| 7,433,922 B2 | 10/2008 | Engstrom | |
| 7,436,939 B1 | 10/2008 | Packingham | |
| 7,436,947 B2 | 10/2008 | Ordille et al. | |
| 7,454,423 B2 | 11/2008 | Powers et al. | |
| 7,461,378 B2 | 12/2008 | Beyda | |
| 7,464,139 B2 | 12/2008 | Malik | |
| 7,487,437 B2 | 2/2009 | Aureglia et al. | |
| 7,552,204 B2 | 6/2009 | Bobde et al. | |
| 7,554,938 B1 | 6/2009 | Smith et al. | |
| 7,627,666 B1 | 12/2009 | DeGiulio et al. | |
| 7,631,047 B1 | 12/2009 | Adamczyk | |
| 7,657,616 B1 | 2/2010 | Poling et al. | |
| 7,664,817 B2 | 2/2010 | Watanabe et al. | |
| 7,668,915 B2 | 2/2010 | Couts et al. | |
| 7,668,917 B2 | 2/2010 | Netsch et al. | |
| 7,725,523 B2 | 5/2010 | Bolnick et al. | |
| 7,814,208 B2 | 10/2010 | Stephenson et al. | |
| 7,899,879 B2 | 3/2011 | Broda | |
| 7,904,823 B2 | 3/2011 | Beauchamp et al. | |
| 7,912,899 B2 | 3/2011 | Beauchamp et al. | |
| 7,925,771 B1 | 4/2011 | Ping et al. | |
| 7,936,815 B2 | 5/2011 | Dankworth et al. | |
| 7,941,542 B2 | 5/2011 | Broda et al. | |
| 7,945,846 B2 | 5/2011 | Beauchamp et al. | |
| 8,001,185 B2 | 8/2011 | Nicholls et al. | |
| 8,165,993 B2 | 4/2012 | Broda et al. | |
| 8,255,454 B2 | 8/2012 | Broda | |
| 2001/0034733 A1 | 10/2001 | Prompt et al. | |
| 2001/0039616 A1 | 11/2001 | Kumagai et al. | |
| 2001/0040945 A1 | 11/2001 | Fujino et al. | |
| 2001/0049683 A1 | 12/2001 | Yoshikawa | |
| 2001/0049721 A1 | 12/2001 | Blair et al. | |
| 2002/0013853 A1 | 1/2002 | Baber et al. | |
| 2002/0023143 A1 | 2/2002 | Stephenson et al. | |
| 2002/0032602 A1 | 3/2002 | Lanzillo et al. | |
| 2002/0038217 A1 | 3/2002 | Young | |
| 2002/0038362 A1 | 3/2002 | Bhatia et al. | |
| 2002/0056000 A1 * | 5/2002 | Coussement | 709/225 |
| 2002/0057657 A1 * | 5/2002 | La Porta et al. | 370/331 |
| 2002/0057678 A1 | 5/2002 | Jiang et al. | |
| 2002/0059425 A1 * | 5/2002 | Belfiore et al. | 709/226 |
| 2002/0059472 A1 | 5/2002 | Wollrath et al. | |
| 2002/0065894 A1 | 5/2002 | Dalal et al. | |
| 2002/0073236 A1 | 6/2002 | Helgeson et al. | |
| 2002/0075303 A1 * | 6/2002 | Thompson et al. | 345/751 |
| 2002/0078208 A1 | 6/2002 | Crump et al. | |
| 2002/0083067 A1 | 6/2002 | Tamayo et al. | |
| 2002/0083072 A1 | 6/2002 | Steuart | |
| 2002/0083118 A1 | 6/2002 | Sim | |
| 2002/0095465 A1 | 7/2002 | Banks et al. | |
| 2002/0103909 A1 | 8/2002 | Devine et al. | |
| 2002/0107864 A1 | 8/2002 | Battas et al. | |
| 2002/0107905 A1 | 8/2002 | Roe et al. | |
| 2002/0107957 A1 | 8/2002 | Zargham et al. | |
| 2002/0116362 A1 | 8/2002 | Li et al. | |
| 2002/0116461 A1 | 8/2002 | Diacakis et al. | |
| 2002/0120697 A1 | 8/2002 | Generous et al. | |
| 2002/0120765 A1 | 8/2002 | Boehmke | |
| 2002/0138640 A1 | 9/2002 | Raz et al. | |
| 2002/0143710 A1 | 10/2002 | Liu | |
| 2002/0147777 A1 | 10/2002 | Hackbarth et al. | |
| 2002/0152402 A1 | 10/2002 | Tov et al. | |
| 2002/0165849 A1 | 11/2002 | Singh et al. | |
| 2002/0178035 A1 | 11/2002 | Lajouanie | |
| 2002/0178353 A1 | 11/2002 | Graham | |
| 2002/0184187 A1 | 12/2002 | Bakalash et al. | |
| 2002/0194393 A1 | 12/2002 | Hrischuk et al. | |
| 2002/0198985 A1 | 12/2002 | Fraenkel et al. | |
| 2002/0199203 A1 * | 12/2002 | Duffy et al. | 725/109 |
| 2003/0004742 A1 | 1/2003 | Palmer et al. | |
| 2003/0009603 A1 | 1/2003 | Ruths et al. | |
| 2003/0014513 A1 | 1/2003 | Ruths et al. | |
| 2003/0018719 A1 | 1/2003 | Ruths et al. | |
| 2003/0023691 A1 * | 1/2003 | Knauerhase | 709/206 |
| 2003/0028597 A1 | 2/2003 | Salmi et al. | |
| 2003/0028682 A1 | 2/2003 | Sutherland | |
| 2003/0028683 A1 | 2/2003 | Yorke et al. | |
| 2003/0033329 A1 | 2/2003 | Bergman et al. | |
| 2003/0037103 A1 | 2/2003 | Salmi et al. | |
| 2003/0037113 A1 * | 2/2003 | Petrovykh | 709/205 |
| 2003/0041108 A1 * | 2/2003 | Henrick et al. | 709/205 |
| 2003/0071850 A1 | 4/2003 | Geidl | |
| 2003/0074393 A1 | 4/2003 | Peart | |
| 2003/0088633 A1 | 5/2003 | Chiu et al. | |
| 2003/0093585 A1 | 5/2003 | Allan | |
| 2003/0101201 A1 | 5/2003 | Saylor et al. | |
| 2003/0101223 A1 | 5/2003 | Pace et al. | |
| 2003/0105837 A1 | 6/2003 | Kamen et al. | |
| 2003/0110249 A1 | 6/2003 | Buus et al. | |
| 2003/0112948 A1 | 6/2003 | Brown et al. | |
| 2003/0115186 A1 | 6/2003 | Wilkinson et al. | |
| 2003/0120805 A1 | 6/2003 | Couts et al. | |
| 2003/0126136 A1 | 7/2003 | Omoigui | |
| 2003/0131069 A1 * | 7/2003 | Lucovsky et al. | 709/217 |
| 2003/0131142 A1 * | 7/2003 | Horvitz et al. | 709/313 |
| 2003/0154177 A1 | 8/2003 | Holland et al. | |
| 2003/0158873 A1 | 8/2003 | Sawdon et al. | |
| 2003/0182428 A1 | 9/2003 | Li et al. | |
| 2003/0182461 A1 | 9/2003 | Stelting et al. | |
| 2003/0187971 A1 | 10/2003 | Uliano et al. | |
| 2003/0204741 A1 * | 10/2003 | Schoen et al. | 713/200 |
| 2003/0208543 A1 | 11/2003 | Enete et al. | |
| 2003/0217081 A1 | 11/2003 | White et al. | |
| 2003/0217142 A1 | 11/2003 | Bobde et al. | |
| 2003/0218631 A1 * | 11/2003 | Malik | 345/739 |
| 2003/0220860 A1 | 11/2003 | Heytens et al. | |
| 2003/0229722 A1 | 12/2003 | Beyda | |
| 2003/0235279 A1 | 12/2003 | Richomme | |
| 2004/0002360 A1 | 1/2004 | Chun et al. | |
| 2004/0002958 A1 * | 1/2004 | Seshadri et al. | 707/3 |
| 2004/0003090 A1 | 1/2004 | Deeds | |
| 2004/0010543 A1 | 1/2004 | Grobman | |
| 2004/0019695 A1 | 1/2004 | Fellenstein et al. | |
| 2004/0024822 A1 | 2/2004 | Werndorfer et al. | |
| 2004/0030762 A1 | 2/2004 | Silverthorne et al. | |
| 2004/0031054 A1 | 2/2004 | Dankworth et al. | |
| 2004/0039776 A1 | 2/2004 | Ballard | |
| 2004/0039800 A1 | 2/2004 | Black et al. | |
| 2004/0049477 A1 | 3/2004 | Powers et al. | |
| 2004/0054802 A1 | 3/2004 | Beauchamp et al. | |
| 2004/0060001 A1 | 3/2004 | Coffen et al. | |
| 2004/0073596 A1 | 4/2004 | Kloninger et al. | |
| 2004/0080504 A1 | 4/2004 | Salesky et al. | |
| 2004/0087300 A1 | 5/2004 | Lewis | |
| 2004/0146044 A1 | 7/2004 | Herkerdorf et al. | |
| 2004/0152477 A1 | 8/2004 | Wu et al. | |
| 2004/0254998 A1 | 12/2004 | Horvitz | |
| 2005/0004984 A1 | 1/2005 | Simpson | |
| 2005/0055329 A1 | 3/2005 | Bakalash et al. | |
| 2005/0086211 A1 | 4/2005 | Mayer | |
| 2005/0102294 A1 | 5/2005 | Coldewey | |

| | | | |
|---|---|---|---|
| 2005/0102611 | A1 | 5/2005 | Chen |
| 2005/0114534 | A1 | 5/2005 | Lee |
| 2005/0125377 | A1 | 6/2005 | Kotler |
| 2005/0144114 | A1 | 6/2005 | Ruggieri et al. |
| 2005/0187982 | A1 | 8/2005 | Sato |
| 2006/0089939 | A1 | 4/2006 | Broda et al. |
| 2006/0161540 | A1 | 7/2006 | Schmitz et al. |
| 2006/0206589 | A1 | 9/2006 | Lentini et al. |
| 2006/0259626 | A1 | 11/2006 | Stone-Kaplan et al. |
| 2007/0192495 | A1 | 8/2007 | Marais |
| 2008/0004904 | A1 | 1/2008 | Tran |
| 2008/0043256 | A1 | 2/2008 | Broda et al. |
| 2008/0046505 | A1 | 2/2008 | Netsch et al. |
| 2008/0046506 | A1 | 2/2008 | Broda |
| 2008/0046510 | A1 | 2/2008 | Beauchamp et al. |
| 2008/0046536 | A1 | 2/2008 | Broda |
| 2008/0046556 | A1 | 2/2008 | Nicholls et al. |
| 2008/0046568 | A1* | 2/2008 | Broda et al. .................. 709/227 |
| 2008/0046803 | A1 | 2/2008 | Beauchamp et al. |
| 2008/0046837 | A1 | 2/2008 | Beauchamp et al. |
| 2008/0077656 | A1 | 3/2008 | Broda |
| 2008/0148289 | A1 | 6/2008 | Nicholls et al. |
| 2008/0209490 | A1 | 8/2008 | Dankworth et al. |
| 2009/0031205 | A1 | 1/2009 | Aureglia et al. |
| 2009/0037803 | A1 | 2/2009 | Bauchot |
| 2011/0167169 | A1 | 7/2011 | Ping et al. |
| 2012/0060078 | A1 | 3/2012 | Beauchamp et al. |

OTHER PUBLICATIONS

"Middleware—The Essential Component for Enterprise Client/Server Applications," International Systems Group, Inc., Feb. 1997.
Pioch, Nicholas, "A Short IRC Primer," Jan. 1, 1997.
Stephanidis, Constantine et al., "Design Representations and Development Support for User Interface Adaptation," Institute of Computer Science Foundation for Research and Technology, 1995.
"An Introduction to Messaging and Queuing," IBM Corp., Jun. 1995.
"Relational OLAP: An Enterprise-Wide Data Delivery Architecture," MicroStrategy, Inc., 1994.
"Guidelines for Implementing and Using the NBS Data," Federal Information Processing Standards, Publication 74, Apr. 1, 1981.
"ILOG Views 2D Graphics: The C++ Library for Interactive 2D Graphics," ILOG.
"Sametime 3 Features and Benefits," IBM.
"Scripting Support for Web Page Printing Sample," Microsoft Corp., 2004.
Oikarinen, Jarkko et al., "Internet Relay Chat Protocol," Network Working Group, May 1993.
"Report of Novelty Search," PATENTEC, dated Oct. 16, 2003.
Using Microsoft Excel 97 Manual. Bestseller Edition. Que Corporation, 1997.
Microsoft Excel Print Screen Images (figs. 1-6).
"Introduction to Dynamic HTML," http://msdn2.microsoft.com/en-us/library/ms533044(d=printer).aspx, downloaded Jul. 17, 2007.
Excel 2000, publ. by Microsoft in 1999, screen captures pp. 1-12.
Extensible Markup Language (XML) 1.0 (Second Edition), Oct. 6, 2000, printed from w3.org.
Ünal, A., "Electronic Commerce and Multi-enterprise Supply/Value/Business Chains," Information Sciences, Aug. 2000, pp. 63-68, vol. 127, Issues 1-2, NH Elsevier.
Karn, P. et al., "The ESP Triple DES Transform," Network Working Group, Request for Comments: 1851, Category: Experimental, Sep. 1995, pp. 1-11.
Goldsmith, D. et al., "UTF-7: A Mail-Safe Transformation Format of Unicode," Network Working Group, Request for Comments: 2152, Obsoletes: RFC 1642, Category: Informational, May 1997, pp. 1-15.
Notice of Allowance for U.S. Appl. No. 12/035,376, mailed Jan. 25, 2011, 8 pages.
Notice of Allowance for U.S. Appl. No. 10/391,128, mailed Dec. 30, 2010, 3 pages.
Notice of Allowance for U.S. Appl. No. 10/390,978, mailed Jan. 4, 2011, 4 pages.
Office Action for U.S. Appl. No. 10/289,231: Notice of Allowance mailed Nov. 5, 2010, 9 pages.
Office Action for U.S. Appl. No. 11/763,134: Final Office Action mailed Nov. 24, 2010, 25 pages.
Office Action for U.S. Appl. No. 11/299,441: Office Action mailed Oct. 26, 2010, 31 pages.
Office Action for U.S. Appl. No. 10/391,073: Notice of Allowance mailed Oct. 27, 2010, 10 pages.
Notice of Allowance for U.S. Appl. No. 12/035,376 mailed Mar. 18, 2011, 6 pages.
Notice of Allowance for U.S. Appl. No. 10/391,544 mailed Oct. 28, 2010, 5 pages.
Final Office Action for U.S. Appl. No. 11/299,441 mailed Mar. 7, 2011, 30 pages.
Advisory Action for U.S. Appl. No. 11/299,441 mailed May 18, 2011, 3 pages.
U.S. Appl. No. 11/299,441, filed Dec. 12, 2005, Advisory Action mailed Sep. 2, 2010, 3 pages.
U.S. Appl. No. 11/299,441, filed Dec. 12, 2005, Office Action mailed Aug. 9, 2011, 35 pages.
"Report of Novelty Search," PATENTEC, dated Apr. 4, 2004.
"Steel-Belted Radius/Enterprise Edition," Funk Software, Inc., 2004.
"Jabber: About: Technology Overview," Jabber Software Foundation, Dec. 12, 2003.
Smith, Jan, "Browser Basics: Printing," http://www.jegsworks.com/Lessons/web/basics/printing,htm, Feb. 10, 2003.
Perfetti, Christine et al., "Macromedia Flash: A New Hope for Web Applications." User Interface Engineering, 2002.
Weiss, Aaron, "The Document Object Model Dissected," Jupitermedia Corporation, 2002.
"Protecting the Enterprise from Rogue Protocols," Akonix Systems, Inc., 2002.
"Informatica Applications: Leverage Your Enterprise Information for Better Decision Making," Informatica Corporation, 2002.
"Informatica Applications: Informatica Customer Relationship Analytics," Informatica Corporation, 2002.
"Brocade Rapidly Implements Customer and Sales Analytics," Informatica Corporation, 2002.
Howlett, Dennis et al., "Delivering Value Back to the Business: A Guide to Successful Portal Selection and Implementation." TIBCO Software, 2002.
"Sametime for iSeries 2.5," Lotus Software, IBM Corporation, 2002.
"Business Intelligence Software: Engendering a Quiet Revolution in the Business Place," MicroStrategy, Dec. 20, 2002.
Woods, Bob, "CypherGuard Secures MSN, Windows IM," JupiterMedia Corporation, Oct. 3, 2002.
"Business Transformation Through End-to-End Integration," IBM, Aug. 2002.
"The Sagent Analytic Advantage," Sagent Technology Inc., May 2002.
Watson, Hugh J., "Recent Developments in Data Warehousing," *Communications of the Association for Information Systems*, pp. 1-25, vol. 8, 2001.
"The Business Intelligence Industry's Leading Products and Services," Business Objects, 2001.
Brewster, Stephen, "Windowing Systems," Glasgow Interactive Systems Group, 2001.
"Express Communicator," White Paper, ACD Systems Ltd., May 2001.
"Business Rules Powering Business and E-Business," White Paper, ILOG, May 2001.
"A Data Warehouse Tutorial," Paretoanalysts, Dec. 27, 2001.
"The Sagent Performance Story," Sagent Technology, Inc., Oct. 2001.
"Achieving Global Business Visibility With the webMethods Integration Platform," webMethods, Inc., Sep. 2001.
Bernstein, Philip A. et al., "Data Warehouse Scenarios for Model Management," Microsoft Corporation, 2000.
"Implementing the RosettaNet eBusiness Standard: Automating High-tech Supply Chains Using Business Ware for RosettaNet," Vitria Technology Inc., 2000.
Wang, Wenjie et al., "Instant Messaging Insight," Computer Science Department, New York Unuversity, Nov. 22, 2000.
"X Window System: Getting Started," Stanford University, Oct. 26, 2000.

Day, Mark et al., "A Model for Presences and Instant Messaging," Network Working Group, Request for Comments 2778, The Internet Society, Feb. 2000.
"The Basics of the Browser," Santa Clara County Office of Education Internet Institutue (SCCOE), 1999.
Corke, Randy, "Keeping Data Warehouse Current: Automating Incremental Updates with Data Movement," DM Direct, May 1999.
Moran, Brian et al., "Getting to Know OLAP and MDX," Windows IT Pro, Instant Doc #5112, Apr. 1999.
Handley, Mark et al., "SIP: Session Initiation Protocol," Network Working Group, Request for Comments 2543, The Internet Society, Mar. 1999.
"MQSeries Link for R/3," IBM, 1998.
Tsai, Michael, "The Personal Computing Paradigm," ATPM Inc., 1998.
Schoedl, Arno, "Issues for Implementing User Interface Software," Georgia Institute of Technology, Sep. 26, 1998.
"Print Without Pop Up Window Using Javascript," Experts Exchange, posted Nov. 3, 2002.
"Adding Printing Capabilities," Interactivetools.com, posted Oct. 19, 2002.
Loo, Thomas et al., "How Can I Print a Document That is Not Currently Loaded Into a Frame or Window?" Synop Software, Apr. 24, 2002.
Howlett, Jake, "Further Control of Printing," Codestore, Jan. 3, 2002.
Cimino, Steve, "How Can I Print a Web Page in ASP?", Internet.com Corp., posted Jul. 27, 2001.
"JavaScript: MSIE 5 Unable to Print Child Window." Experts Exhange, posted Jun. 7, 2000.
Nonsenko, Andrew, "Scripting Support for Web Page Printing," Microsoft Corporation, Mar. 28, 2000.
Movva, Ramu et al., "MSM Messenger Service 1.0 Protocol," Internet Draft, Aug. 1999.
Richardson, Tristan et al., "The RFB Protocol," ORL Cambridge, Jul. 16, 1998.
Gwinn, Allen, "Simple Network Paging Protocol—Version 3—Two-Way Enhanced," Network Working Group, Oct. 1995.
Dabke, P, "Enterprise Integration Via Corba-Based Information Agents," IEEE Internet Computing, Sep./Oct. 1999, pp. 49-57, vol. 3, Issue 5.
Habraken, J. "Ten Minute Guide to Microsoft Excel 2002," Sep. 27, 2001, Que, Section, "Lesson 6, Performing Calculations with Functions."
Roman, S. "Writing Excel Macros with VBA: Second Edition," Jun. 25, 2002, Chapter 6: Functions and Subroutines.
Anton, Jesse et al., "Web Catching for Database Applications with Oracle Cache", Jun. 4-6, 2002, pp. 594-599.
Office Action for U.S. Appl. No. 10/237,559, dated Feb. 1, 2008; 12 pages total.
Final Office Action for U.S. Appl. No. 10/289,155, dated Jan. 29, 2008; 14 pages total.
Office Action for U.S. Appl. No. 10/289,155, dated Jul. 28, 2008, 12 pages total.
Office Action for U.S. Appl. No. 10/289,162, dated Nov. 30, 2007; 12 pages total.
Office Action of U.S. Appl. No. 10/289,231, dated Nov. 6, 2008, 10 pages total.
Office Action of U.S. Appl. No. 10/289,231 dated Apr. 30, 2009, 10 pages total.
Office Action for U.S. Appl. No. 10/390,978, dated Mar. 5, 2009, 19 pages total.
Office Action for U.S. Appl. No. 10/390,978, dated Sep. 4, 2009, 24 pages total.
Office Action for U.S. Appl. No. 10/391,073, dated Jan. 4, 2008; 8 pages total.
Office Action for U.S. Appl. No. 10/391,073, dated Sep. 12, 2008, 10 pages total.
Office Action for U.S. Appl. No. 10/391,073, dated Feb. 12, 2009, 8 pages total.
Final Office Action for U.S. Appl. No. 10/391,073, dated Jul. 30, 2009, 9 pages total.
Advisory Action for U.S. Appl. No. 10/391,073, dated Sep. 18, 2009, 3 pages total.
Office Action for U.S. Appl. No. 10/391,128, dated Oct. 6, 2008, 20 pages total.
Final Office Action for U.S. Appl. No. 10/391,128, dated May 13, 2009, 18 pages total.
Office Action for U.S. Appl. No. 10/391,128, dated Oct. 27, 2009, 20 pages total.
Final Office Action for U.S. Appl. No. 10/391,544, dated Sep. 17, 2008, 15 pages total.
Final Office Action for U.S. Appl. No. 10/391,544, dated Aug. 28, 2009, 18 pages total.
Office Action for U.S. Appl. No. 11/299,441, dated Feb. 5, 2008, 19 pages total.
Office Action for U.S. Appl. No. 11/299,441, dated Sep. 11, 2009, 22 pages total.
Office Action for U.S. Appl. No. 10/390,978, dated Sep. 1, 2005, 15 pages total.
Final Office Action for U.S. Appl. No. 10/390,978, dated May 18, 2006, 13 pages total.
Office Action for U.S. Appl. No. 10/390,978, dated Feb. 21, 2007, 16 pages total.
Final Office Action for U.S. Appl. No. 10/390,978, dated Jun. 25, 2007, 17 pages total.
Office Action for U.S. Appl. No. 10/390,978, dated Jan. 9, 2008, 16 pages total.
Final Office Action for U.S. Appl. No. 10/390,978, dated Sep. 3, 2008, 17 pages total.
Advisory Action for U.S. Appl. No. 10/390,978, dated Nov. 3, 2008, 3 pages total.
Final Office Action for U.S. Appl. No. 10/390,978, dated Sep. 4, 2009, 24 pages total.
Office Action for U.S. Appl. No. 10/390,978, dated Dec. 14, 2009, 25 pages total.
Office Action of U.S. Appl. No. 10/289,231, dated Dec. 9, 2005, 17 pages total.
Final Office Action of U.S. Appl. No. 10/289,231, dated Apr. 11, 2006, 15 pages total.
Office Action of U.S. Appl. No. 10/289,231, dated Nov. 30, 2006, 13 pages total.
Final Office Action of U.S. Appl. No. 10/289,231, dated Apr. 16, 2007, 15 pages total.
Office Action of U.S. Appl. No. 10/289,231, dated Apr. 15, 2008, 12 pages total.
Final Office Action of U.S. Appl. No. 10/289,231, dated Dec. 14, 2009, 9 pages total.
Office Action for U.S. Appl. No. 10/289,155, dated May 18, 2006; 11 pages total.
Final Office Action for U.S. Appl. No. 10/289,155, dated Mar. 27, 2007; 12 pages total.
Advisory Action for U.S. Appl. No. 10/289,155, dated May 31, 2007; 3 pages total.
Office Action for U.S. Appl. No. 10/289,155, dated Aug. 6, 2007; 11 pages total.
Advisory Action for U.S. Appl. No. 10/289,155, dated Apr. 14, 2008; 3 pages total.
Final Office Action for U.S. Appl. No. 10/289,155, dated Jan. 6, 2009; 11 pages total.
Notice of Allowance for U.S. Appl. No. 10/289,155, dated Jun. 11, 2009; 9 pages total.
Notice of Allowance for U.S. Appl. No. 10/289,155, dated Sep. 29, 2009; 7 pages total.
Office Action for U.S. Appl. No. 10/391,128, dated Jul. 20, 2007, 9 pages total.
Final Office Action for U.S. Appl. No. 10/391,128, dated Mar. 19, 2008, 12 pages total.
Advisory Action for U.S. Appl. No. 10/391,128, dated Jul. 21, 2008, 3 pages total.
Advisory Action for U.S. Appl. No. 10/391,128, dated Jul. 20, 2009, 3 pages total.
Office Action for U.S. Appl. No. 10/391,544, dated Sep. 8, 2006, 12 pages total.
Advisory Action for U.S. Appl. No. 10/391,544, dated Dec. 3, 2008, 6 pages total.

Office Action for U.S. Appl. No. 10/391,544, dated Feb. 3, 2009, 16 pages total.
Advisory Action for U.S. Appl. No. 10/391,544, dated Dec. 11, 2009, 2 pages total.
Notice of Allowance for U.S. Appl. No. 10/391,544, dated Mar. 25, 2010, 12 pages total.
Office Action for U.S. Appl. No. 10/452,665, dated Dec. 7, 2006, 8 pages total.
Final Office Action for U.S. Appl. No. 10/452,665, dated May 9, 2007, 7 pages total.
Final Office Action for U.S. Appl. No. 11/299,441, dated Oct. 3, 2008, 18 pages total.
Advisory Action for U.S. Appl. No. 11/299,441, dated Dec. 16, 2008, 3 pages total.
Office Action for U.S. Appl. No. 11/299,441, dated Feb. 4, 2009, 19 pages total.
Office Action for U.S. Appl. No. 11/299,441, dated Jan. 5, 2010, 27 pages total.
Office Action for U.S. Appl. No. 10/391,073, dated Feb. 8, 2007; 7 pages total.
Final Office Action for U.S. Appl. No. 10/391,073, dated Jun. 21, 2007; 7 pages total.
Advisory Action for U.S. Appl. No. 10/391,073, dated Oct. 28, 2008; 3 pages total.
Office Action for U.S. Appl. No. 10/391,073, dated Jan. 19, 2010; 9 pages total.
Office Action for U.S. Appl. No. 11/763,134, dated Jun. 3, 2010; 21 pages total.
Office Action for U.S. Appl. No. 10/289,231, dated Apr. 12, 2010, 12 pgs.
Office Action for U.S. Appl. No. 10/390,978, dated Jun. 17, 2010, 28 pgs.
Final Office Action for U.S. Appl. No. 10/391,073, dated Jun. 17, 2010; 9 pgs.
Advisory Action for U.S. Appl. No. 10/391,073, dated Aug. 23, 2010; 2 pgs.
Final Office Action for U.S. Appl. No. 10/391,128, dated Jul. 7, 2010, 25 pages total.
Notice of Allowance for U.S. Appl. No. 10/391,544, dated Aug. 13, 2010, 10 pages total.
Final Office Action for U.S. Appl. No. 11/299,441, dated Jun. 25, 2010, 28 pages total.
Final Office Action for U.S. Appl. No. 10/390,978, dated Jun. 17, 2010, 28 pages total.
Office Action of U.S. Appl. No. 10/289,139 dated Dec. 9, 2005, 14 pages total.
Final Office Action of U.S. Appl. No. 10/289,139 dated Apr. 11, 2006, 16 pages total.
Office Action of U.S. Appl. No. 10/289,139 dated Nov. 30, 2006, 14 pages total.
Notice of Allowance of U.S. Appl. No. 10/289,139 dated May 1, 2007, 6 pages total.
Office Action of U.S. Appl. No. 10/289,142 dated Dec. 20, 2005, 9 pages total.
Final Office Action of U.S. Appl. No. 10/289,142 dated Apr. 24, 2006, 12 pages total.
Office Action of U.S. Appl. No. 10/289,142 dated Dec. 4, 2006, 9 pages total.
Final Office Action of U.S. Appl. No. 10/289,142 dated May 30, 2007, 10 pages total.
Notice of Allowance of U.S. Appl. No. 10/289,142 dated Jan. 4, 2008, 9 pages total.
Notice of Allowance of U.S. Appl. No. 10/289,142 dated May 2, 2008, 5 pages total.
Office Action of U.S. Appl. No. 10/390,945 dated Feb. 9, 2007, 8 pages total.
Final Office Action of U.S. Appl. No. 10/390,945 dated Jul. 5, 2007, 9 pages total.
Notice of Allowance of U.S. Appl. No. 10/390,945 dated Jan. 9, 2008, 7 pages total.
Notice of Allowance of U.S. Appl. No. 10/390,945 dated Jun. 9, 2008, 7 pages total.
Office Action of U.S. Appl. No. 10/289,162 dated Dec. 21, 2005, 12 pages total.
Final Office Action of U.S. Appl. No. 10/289,162 dated Apr. 20, 2007, 8 pages total.
Notice of Allowance of U.S. Appl. No. 10/289,162 dated Nov. 30, 2007, 12 pages total.
Notice of Allowance of U.S. Appl. No. 10/289,162 dated Apr. 16, 2008, 17 pages total.
Office Action of U.S. Appl. No. 10/237,559 dated Jan. 31, 2005, 11 pages total.
Office Action of U.S. Appl. No. 10/237,559 dated Aug. 8, 2005, 11 pages total.
Final Office Action of U.S. Appl. No. 10/237,559 dated Dec. 30, 2005, 10 pages total.
Office Action of U.S. Appl. No. 10/237,559 dated Jan. 11, 2007, 10 pages total.
Final Office Action of U.S. Appl. No. 10/237,559 dated Aug. 15, 2007, 13 pages total.
Advisory Action of U.S. Appl. No. 10/237,559 dated Oct. 25, 2007, 3 pages total.
Office Action of U.S. Appl. No. 10/237,559 dated Feb. 1, 2008, 12 pages total.
Notice of Allowance of U.S. Appl. No. 10/237,559 dated Aug. 21, 2008, 9 pages total.
Office Action of U.S. Appl. No. 12/035,376 dated Sep. 15, 2010, 9 pages total.
U.S. Appl. No. 11/763,134, filed Jun. 14, 2007, Office Action mailed Jun. 21, 2012, 31 pages.
U.S. Appl. No. 10/452,665, filed May 30, 2003, Notice of Allowance mailed May 30, 2012, 8 pages.
U.S. Appl. No. 11/299,441, filed Dec. 12, 2005, Notice of Allowance mailed Dec. 19, 2011, 16 pages.
U.S. Appl. No. 10/452,665, filed May 30, 2003, Notice of Allowance mailed Apr. 10, 2012, 3 pages.
U.S. Appl. No. 10/452,665, filed May 30, 2003, Notice of Allowance mailed Feb. 7, 2012, 5 pages.

* cited by examiner

APPARATUS AND METHOD FOR INSTANT MESSAGING COLLABORATION

CROSS-REFERENCES TO RELATED APPLICATIONS

The present application is a divisional of, and claims priority to, U.S. patent application Ser. No. 10/289,162, filed Nov. 5, 2002, entitled "Apparatus and Method For Instant Messaging Collaboration," which claims benefit of U.S. Provisional Application No. 60/410,989, filed Sep. 16, 2002, entitled "Business Intelligence System," all of which are incorporated by reference in their entirety for all purposes.

FIELD OF THE INVENTION

The present invention relates generally to the field of computer-facilitated communications; more particularly, to instant messaging between users logged into a computer network.

BACKGROUND OF THE INVENTION

A paramount concern in a modern enterprise is the ability to quickly respond to changing information. Electronic messaging systems such as instant messaging and e-mail have provided convenient tools for contacting people or groups of people efficiently. These systems provide a fast and inexpensive method for individuals to communicate and collaborate. Reliance on electronic communication has increased markedly in recent years. As technology advances, it is certain that organizations will become more dependent on immediate access to information to excel in a competitive environment.

It is also important for members of an organization to be able to effectively share identical screen images in real-time, such as text and graphics, among one or more client computers. Users typically share these images with one another using e-mail or instant message attachments. A practice known as "screen sharing" or "window sharing" is also used to allow for the display of identical information on computer screens or windows which are mutually connected in a distributed system. Nevertheless, these solutions have shortcomings. For one, instant messaging is not used for screen sharing. Instead, users are typically connected via a slow connect medium, which adversely affects the instantaneous quality of instant messaging. Furthermore, when users send large attachments, there is an overall slowdown in the speed and reliability of their networks as server capacity is consumed at high levels. In addition, instant messaging systems are generally not scalable. There is typically only one path for a message to take over a network, and past systems have lacked the intelligence to find a more optimum path for the instant messages.

Consequently, if there is too much traffic on a particular path, the recipient of an instant message may be subjected to a substantial delay.

Still another major shortcoming of existing instant messaging systems is that they do not provide a secure medium for confidential communication. Instant messaging has been traditionally conducted over the Internet, with communications sent via clear text. This type of insecure forum is often unacceptable for high-security business information. Finally, most instant messaging systems cannot track the presence of an individual throughout an organization. If an emergency happens within the organization, for example, there is no way to automatically alert the proper individuals using existing instant messaging technology.

What is needed is a comprehensive instant messaging system that allows for encrypted communication, collaborative screen sharing using the instant messaging system, and extensibility. Furthermore, an instant messaging system that is able to track the presence of individuals within an organization and to alert those individuals automatically if a predetermined event occurs would also be beneficial.

BRIEF DESCRIPTION OF THE DRAWINGS

The present invention will be understood more fully from the detailed description that follows and from the accompanying drawings, which, however, should not be taken to limit the invention to the specific embodiments shown, but are for explanation and understanding only.

DETAILED DESCRIPTION OF THE INVENTION

A system and method for instant messaging collaboration is described. In the following description, numerous specific details are set forth, such as the architecture of a message center, details regarding particular types of instant messaging collaboration, and the use of the invention for sharing business reports, in order to provide a thorough understanding of the present invention. However, persons having ordinary skill in the computer arts will appreciate that these specific details may not be needed to practice the present invention.

According to one embodiment of the present invention, an instant messaging system is provided that allows users to transmit messages instantaneously to any user located in a list of users contained in the instant messaging system. The system is able to track the presence of users that are using the instant message system within an organization, and to send users alerts about changing information within the organization. For example, if the instant messaging system is used in an oil refinery and there is a dangerous condition occurring in the refinery, an instant message may be sent to the appropriate people within the refinery so that they are able to immediately respond to the event. The system also provides for instant messaging through e-mail if users are not using the instant messaging system.

In one embodiment, the instant messaging system allows users to plug in their own security, such as bit encryption, so that confidential information may be transmitted between users in a highly secure manner. In another embodiment, a proprietary instant messenger allows for peer-to-peer collaboration, completely bypassing a server for instant messaging. In this manner, users of the system may communicate directly with one another and share identical screen images without having to communicate through the Internet, or with any other server, for that matter. If an image on one user's screen changes, this change may be streamed in real-time to all other participants in the instant messaging collaboration. The instant messaging system of the present invention is also extensible, such that message deliveries can be farmed out to back-up servers to send instant messages to users if network traffic necessitates this type of transmission.

Figure 1:
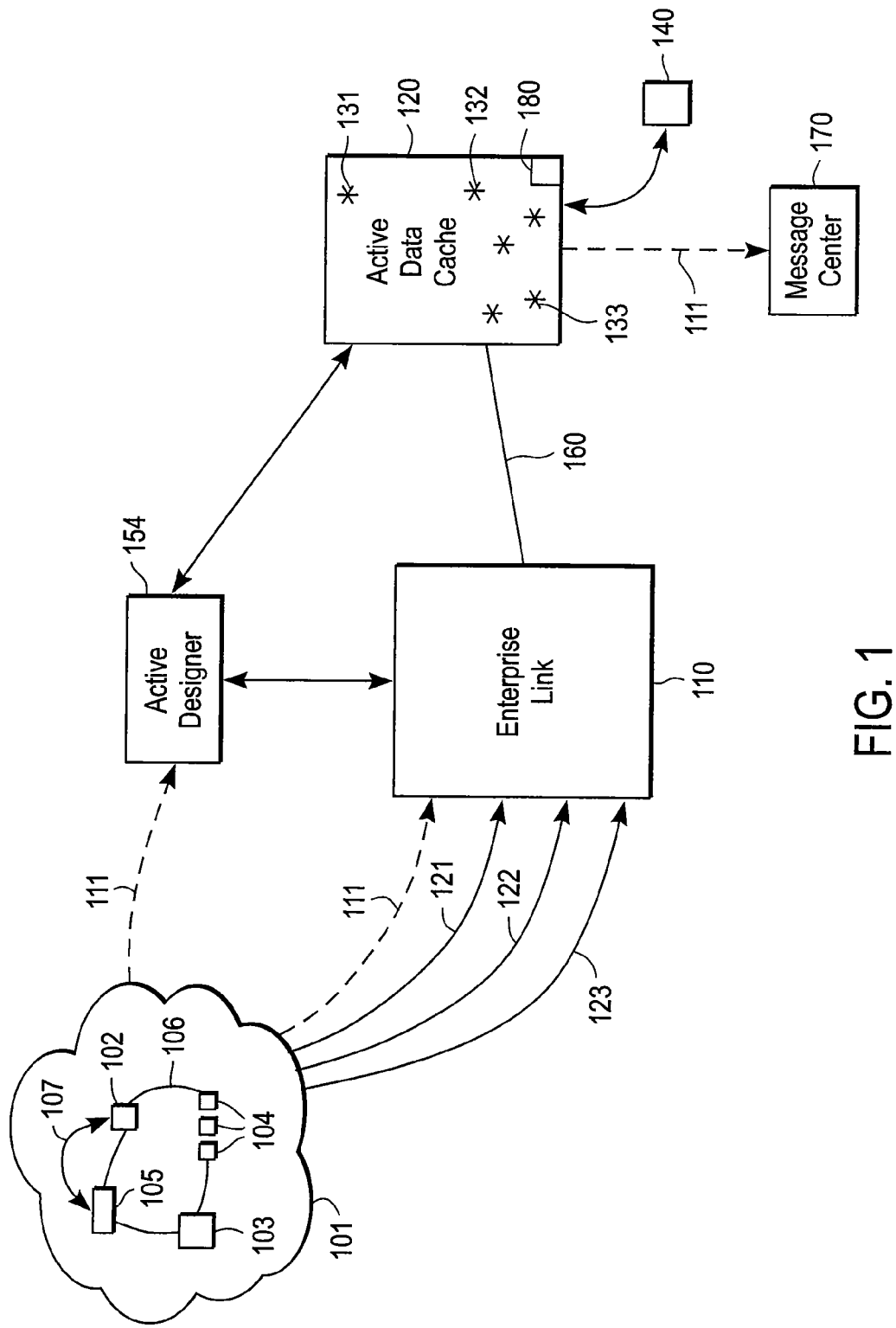
FIG. 1 is a block diagram illustrating an enterprise computing runtime environment according to one embodiment of the present invention.

Referring now to FIG. 1, there is shown a block diagram illustrating an enterprise computing runtime environment according to one embodiment of the present invention. There is shown in FIG. 1 a simplistic view of an enterprise computing runtime environment 101 containing a plurality of enterprise systems that are often utilized in an organization. In FIG. 1, these enterprise systems include "back office" applications 102 for enterprise resource planning (ERP), "front-office" applications 103 for customer relationship management (CRM), customized legacy systems 104, and multidimensional/relational database management systems (RDBMS) 105. Of course, a variety of other applications (not shown in this view) may also exist in the enterprise computing runtime environment 101. These disparate systems may be coupled to one another using a local area network (LAN) 106, a wide area network (WAN) or any other such networking environments commonplace in offices, enterprise-wide computer networks, the intranet, and the Internet. Further, network 106 may include a wireless network, such that one or more computers may operate over a wireless LAN.

As is known in the art, the existing enterprise systems contain a variety of different data about the organization. For example, the ERP system 102 may contain data regarding essential business functions including payroll, manufacturing, general ledger, and human resources, whereas the CRM system 103 may contain core information regarding the organization's customers. As data in these various systems changes (e.g., a sale is made, a new employee is hired, payroll is processed, etc.), one or more message queuing systems 107 may be used to allow these various applications 102, 103, 104, etc., to exchange information on the data being stored in their systems. To this end, one implementation of the present invention employs a message queue server (e.g., the Microsoft RTM message Queue Server (MSMQ) (not shown in this view), although other message queuing systems may be used as well, to provide loosely-coupled and reliable network (across servers) communication services based on a message-queuing model. In MSMQ, messages are sent to a queue, where the message is retained in storage until it is removed and used by another application. In this manner, loosely-coupled applications can share data to provide an enterprise-wide view of information, such as data and business transactions.

An enterprise link 110 is coupled to the enterprise computing runtime environment 101 through a network connection, such as the Internet 111. Of course, as is noted above, the network connection may also be a LAN, a WAN, a wireless network, or any other system of connections that allows one or more computers to exchange information. The enterprise link 110 integrates, in real-time, the disparate data in the message queues. The enterprise link 110 of the present invention is maintained active. It continuously accepts raw data feeds 121, 122, 123, etc., from the existing enterprise systems, and then reformats, synchronizes, and consolidates the data.

In a traditional model, the data in the message queues is usually processed through the dataflow system when a specified number of records had built up within the message queues (i.e., the data is then transmitted in batch mode). According to an algorithm contained within the data flow system of the present invention, however, individual records are processed through to the enterprise link 110 the moment that they appear; that is, the program continuously checks for new messages and handles them in real-time. In this manner, real-time data flow is transmitted through the raw data feeds 121, 122, 123 via the message queues.

It should be noted that although a message queuing system is used in one embodiment, the enterprise link 110 may also obtain data from the enterprise computing runtime environment 101 in a variety of other ways. These sources of data may be, for example, HyperText Transport Protocol ("HTTP") requests and/or Application Programming Interface ("API") calls and/or Web Services calls. In these alternative embodiments, the enterprise link 110 contains a web server (not shown in this view) to process the HTTP requests and/or another application or server to process the API and/or Web Service calls.

Regardless of how the enterprise link 110 receives the raw data feeds (e.g., 121-123) the enterprise link 110 transmits the data it receives from the enterprise computing runtime environment 101 via a network connection 160 to an active data cache (ADC) 120. Alternatively, the data may be transmitted to the ADC 120 via some other connection. The ADC 120 comprises a high-performance, memory-based persistent cache which stores the data (e.g., as shown by stars 131, 132, and 133) it receives from the enterprise link 110. The ADC 120 contains code which may be implemented in software such as Java™, Perl, C++, or other types of programming languages that can be stored on a computer-readable medium (e.g., a disk) to manage the data that is actively changing within the enterprise computing runtime environment 101 and to make the data accessible to the end-user in real-time. In this manner, the data represented by stars 131, 132, and 133 in the ADC 120 is constantly changing such that it is synchronized in real-time with the data in the enterprise computing runtime environment 101. The data 131, 132, and 133 in the ADC 120 may also be made persistent to disk 140, as disk 140 is optionally used for backup, restore, and recovery purposes.

An active designer 154 is the component module of the enterprise link 110 that determines the particular data that is contained within the ADC 120. Active designer 154 determines the process by which the data 131, 132, and 133 is transmitted to the ADC 120. As is shown in FIG. 1, the active designer 154 is also connected to the enterprise computing runtime environment 101 via the Internet 111. The active designer 154 essentially contains one or more lists of data flow definitions that define which operations are to be performed on the data that is transmitted to the active designer 154 through the network connection 111. Again, the code for the data flow definitions may be implemented in software such as JAVA™, Perl, C++, C#, or other types of programming languages that can be stored on a computer-readable medium.

By way of example, when sales data arrives at the ERP 102, the active designer 154 may contain a set of data flow definitions on how to retrieve, transform, and display this data. Each data flow definition may include executable software code instructing the enterprise link 110 to retrieve, by way of example, the data within the salesperson field whenever a sale is made, to describe how many sales that salesperson has made for the day, etc., and then to transmit this data to the ADC 120.

In the embodiment of FIG. 1, the ADC 120 is connected to a message center 170 through the Internet 111. Alternatively, connections to the message center 170 may be made through the intranet, a LAN, a WAN, or any of the other conventional network connections. The message center 170 is essentially a broadcast center in that it transmits instant messages about important data that is actively changing within the enterprise computing runtime environment 101. When the ADC 120 receives a transmission about changing data and/or an event that occurred within the enterprise computing runtime environment 101, it transmits this data to an event engine 180. The event engine 180 may be coupled to the ADC 120 through the Internet, the intranet, a LAN, a WAN, or any of the other network connections. The event engine 180 contains an algorithm for determining that an instant message about the particular event needs to be transmitted to the message center 170. If the event engine 180 determines that a message about the particular event must be transmitted to the message center 170, it transmits this data to an Application Programmer's Interface (API) contained within the message center architecture. The message center 170 then executes instantaneous message delivery to one or more users, as will be described in more detail herein. In addition, the message center 170 allows for instant messaging collaboration among one or more users as will also be described herein. A monitoring service such as a switchboard (not shown in this view), may also track a user of the instant messaging system and will notify a user who is a recipient of an instant message.

Figure 2:
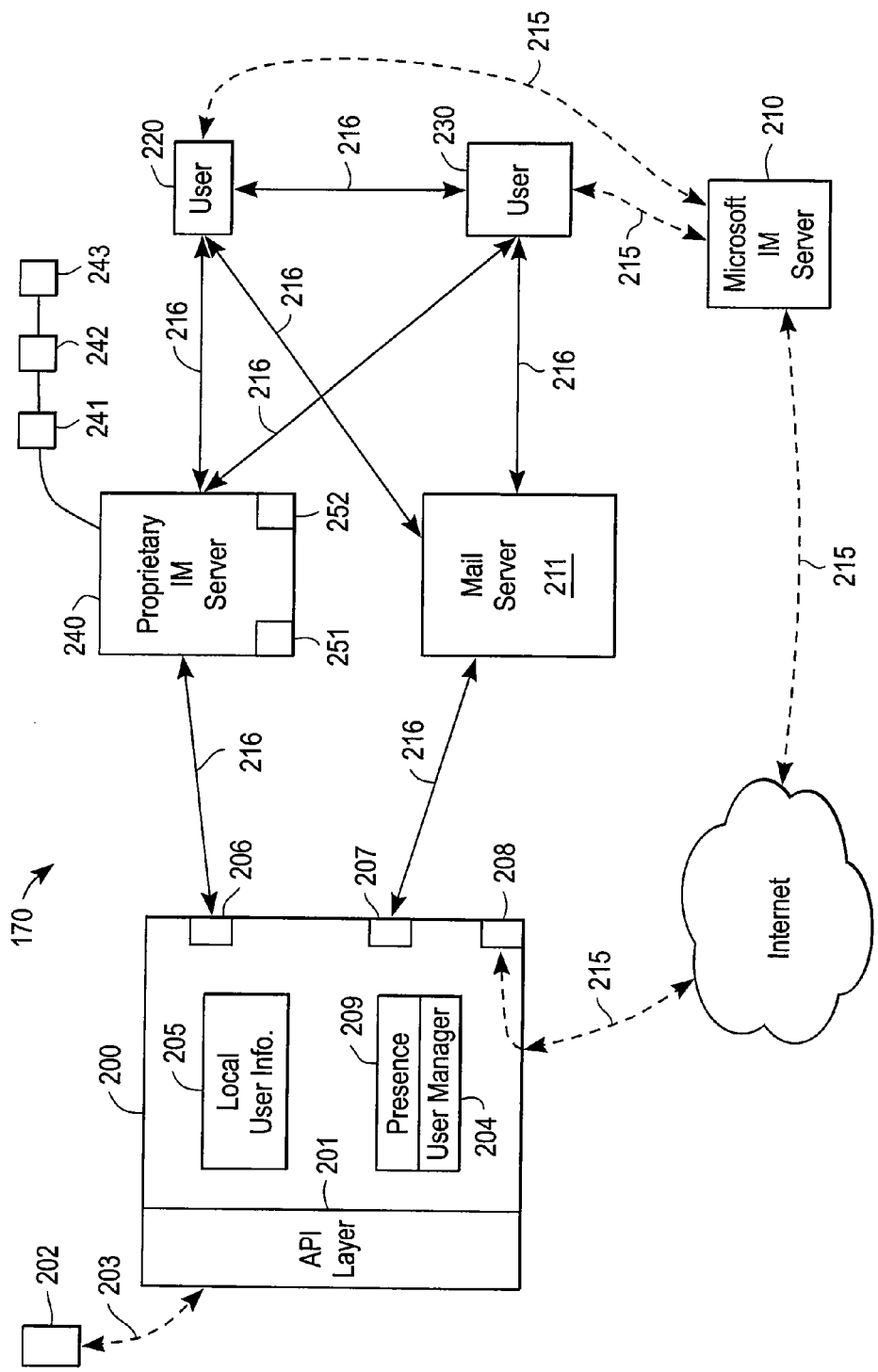
FIG. 2 is a block diagram illustrating message center architecture according to one embodiment of the present invention.

Referring now to FIG. 2 there is shown a block diagram of the message center architecture according to one embodiment of the present invention. The main server component 200 of the message center 170 includes the API layer 201 which may interface with a variety of outside components in an enterprise computing runtime environment through an event engine 202. The event engine 202 may be coupled to the main server component 200 via a network connection 203, such as an intranet or Internet network or any other type of network connection as described herein. The main server component 200 also includes a presence component 209 and a user manager 204. The presence component 209 determines the state of individual instant messenger users 220 and 230; that is, whether users 220 and 230 are on-line or off-line, and variations of how contactable a particular user is. Of course, it should be noted that although only two users 220 and 230 are illustrated in FIG. 2, the number of users may vary. In some instances, hundreds or thousands of users may simultaneously use the instant messaging system described herein.

The presence component 209 may determine, for example, that a user is off-line, and therefore may not receive an instant message. The presence component may also determine that even though a user may not be using instant messaging, that the user has an e-mail address, where the instant message may be sent to be viewed the next time the user checks e-mail. The user manager 204 allows the server component 200 to obtain log-in information for various users. The user manager 204 also maintains lists of users that the server component 200 may communicate with via instant messaging. Local user information 205, including the name and e-mail address of users, may also be contained within the server component 200 of the message center architecture.

A variety of plug-ins 206, 207, and 208, may be connected to the message center 170 to allow the message center 170 to contact instant messaging users 220 and 230. In the embodiment illustrated by FIG. 2, the plug-ins 206, 207, and 208 include a proprietary instant messaging plug-in 206 and a Simple Mail Transfer Protocol (SMTP) plug-in 207 that interfaces directly with a mail server 211. Of course, a variety of other plug-ins may be used as well. A Microsoft instant messaging plug-in 208 allows the message center to interface with Microsoft's instant messaging server 210. The server component 200 logs on to Microsoft's instant messaging server 210 as a peer. The server component 200 has its own user that may log into the Microsoft instant messaging server 210 through a network connection such as the Internet 215.

Components of the enterprise computing runtime environment may use the event engine 202 to transmit messages through the API layer 201 directly to the Microsoft instant messaging server 210 through plug-in 208. The Microsoft instant messaging server 210 may then use the Internet 215 to transmit the instant message to a user 220. For instance, if an instant message needs to be sent to user 220 within an organization, the event engine 202 immediately transmits this message to the server component 200. The user manager 204 resolves the user's e-mail address on the Microsoft instant messaging server 210. The server component 200 employs the presence component 209 to determine whether or not user 220 is on-line. If user 220 is not on-line, then a message is transmitted back to the message center 170 indicating that the user is not on-line and thus cannot be contacted. Alternatively, the server component 200 may send the instant message to the user 220 via e-mail through the SMTP mail protocol plug-in 207 for the user 220 to receive next time the user checks his in-box. If the user 220 is on-line, however, then the plug-in 208 immediately transmits the message via the Internet 215 to the Microsoft instant messaging server 210. The Microsoft instant messaging server 210 then transmits the message to the user 220.

In another embodiment of the present invention, a user 230 may receive instant messages without using the Microsoft instant messaging server 210. For example, the proprietary instant messaging plug-in 206 allows instant messages to be transmitted from the event engine 202 to users who are logged into a proprietary server 240. If a message arrives at the server component 200 from the event engine 202 for the user 230, the user manager 204 is able to resolve the user's 230 e-mail address and transmit the message to the user 230 via the mail server plug-in 207. In addition, the message center is able to determine how the user 230 is logged on to the system. That is, it recognizes that the user 230 is logged on using the proprietary server 240 and therefore is able to send the message to the user 230 via the proprietary instant messaging plug-in 206.

Instant messages may be sent using the proprietary instant messaging plug-in 206 and the SMTP plug-in 207 simultaneously. Or, alternatively, an algorithm within the server component 200 may contain a set of rules to determine the best mode of instant message transmission. For example, if a message arrives at the message center for user 220, an algorithm may dictate that the instant message first try to be sent via the Microsoft instant messaging server 210, next through the proprietary server 240, and, if this fails, through the SMTP plug-in 207 via the mail server 211.

In another embodiment, an algorithm may be used to try to transmit the instant message through the proprietary server 240 first, the Microsoft instant messaging server 210 second, and the mail server 211 last. The proprietary server 240 may be connected to the server component 200 and to the users 230 and 220 via a standard Transmission Control Protocol/Internet Protocol (TCP/IP) connection 216. Thus, the proprietary server 240 allows messages to be transmitted using bit-encryption or other highly secure transmission methods. The users 220 and 230 may also be connected to each other via the TCP/IP connections 216 and to the mail server 211 via the TCP/IP connection 216.

In addition, two components of the proprietary server 240 allow for the farming out of network traffic to multiple in-house servers. A presence component 251 of the proprietary server 240 is able to detect the presence of users 220 and 230 of the system, that is, whether or not users 220 and 230 are logged on to the proprietary server 240. A message component 252 of the proprietary server 240, handles message delivery to users 220 and 230.

If multiple messages are transmitted to the proprietary server 240 it may farm them out to back-up servers 241, 242, 243, etc., via the TCP/IP connection 216 located in-house if network traffic is too extensive. In this way, the instant messaging system is scalable. If hundreds of users in an organization need to receive an instant message, these messages may be farmed out to as many back-up servers 241, 242, 243, etc., as necessary and then transmitted to the appropriate users. Furthermore, users 220 and 230 may also communicate directly, without going through a proprietary server 240. This type of direct connection may be brokered by the proprietary server 240. In this case, the proprietary server 240 may set up a direct connection between user 220 and user 230 if the proprietary server is unable to connect to the users 220 and/or 230.

The proprietary server sets up with direct communication using an algorithm. According to the algorithm, the proprietary server 240 sends user 220 the IP address of user 230 (or vice versa). User 220 and user 230 then try to connect directly, bypassing the proprietary server for communication. If the communication is successful, the users 220 and 230 partake in instant message collaboration. If not, the instant message may be brokered back to the proprietary server 240. Thus, the instant messaging system can not only provide collaboration to users 220 and 230, the instant messaging system may also find the optimum path for the instant messages to use within the system.

Figure 3:
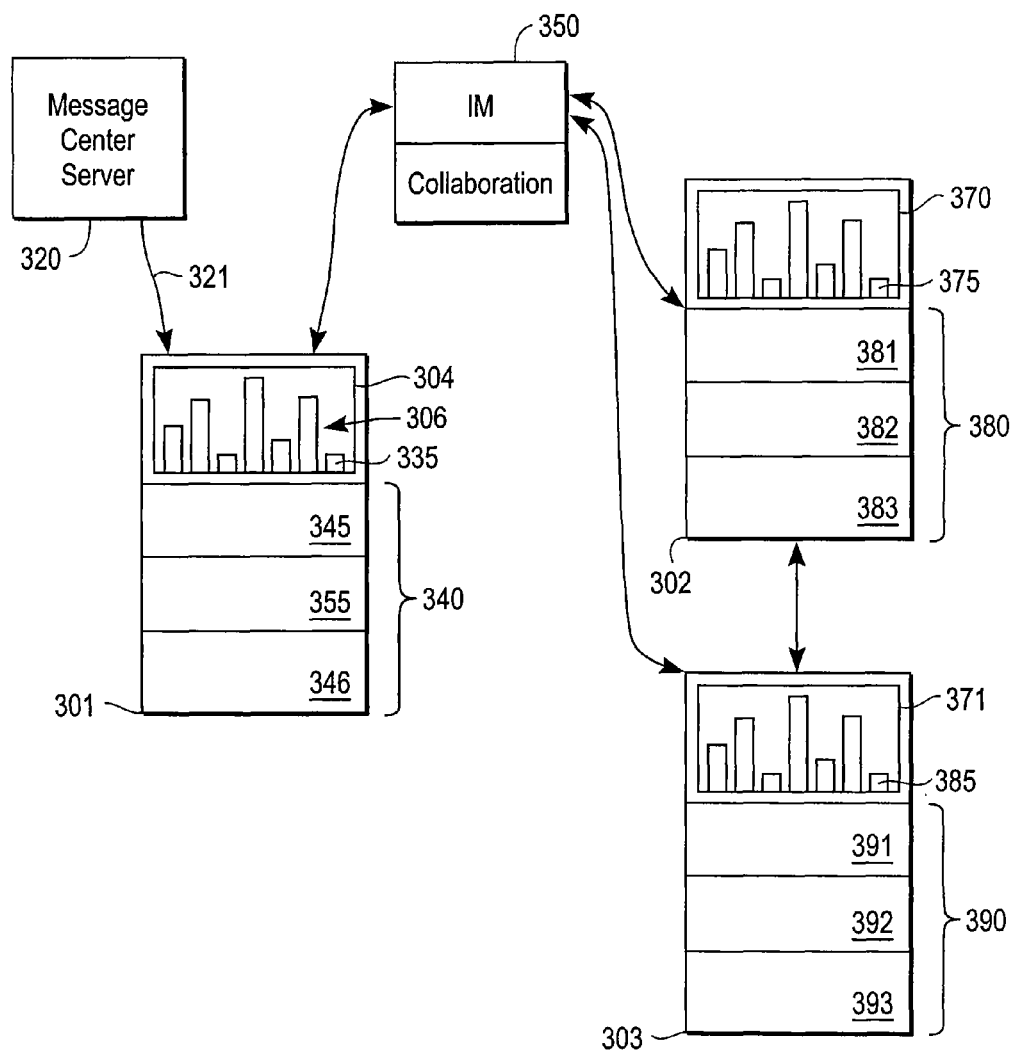
FIG. 3 is a block diagram illustrating instant messaging collaboration according to one embodiment of the present invention.

Referring now to FIG. 3, there is shown a block diagram illustrating instant messaging collaboration according to one embodiment of the present invention. When a user 301 receives a message via the server component 320 of the message center via network connection 321, a chat window or some other icon appears on the user's 301 client computer screen 304. When the user 301 selects the chat window, a new window appears on the client computer screen 304 which contains data that the sender wants the user 301 to see.

In one example, the data may be in the form of a report 306 which is displayed in a specified format, such as a graph. The data may be active. That is, as data changes within the enterprise computing runtime environment these changes are immediately made available to the user 301 (or any user specified by the algorithm contained within the event engine) in real-time via the server component 320 of the message center. At this point, the user's 301 client computer is communicating directly with the server component 320 via connection 321.

Hosted inside the user's 301 client computer is the data. User 301 may click on the chat window to view the data on the user's client computer screen 304. Moreover, the user 301 may share the data with users 302 and 303 via the proprietary server 350. If the user 301 decides to share the data with users 302 and 303, the user 301 may use a viewer 335 to display a drop-down screen 340. A space 345 for text entry in the drop-down screen 340 is provided as well as a conversation window 355 to allow for instant messaging, that is, for "chatting" with users 302 and 303 via the proprietary server 350. The user 301 may send the data comprising the graphical report 306 in the form of an instant message to users 302 and 303 through the proprietary server 350. This message is streamed through the propriety server 350 via the instant messaging protocol. Icons appear on users' 302 and 303 client computer screens 370 and 371, indicating that they are the recipients of an instant message. When the users 302 and 303 click on the icons, they are able to see the exact data, in this example, the graphical report 306, that is shown on user's 301 computer screen. Users 302 and 303 are able to click on their viewers 375 and 385, to display drop-down screens 380 and 390. Spaces for text entry 381 and 391 and conversation windows 382 and 392 may be used to convey messages to users 301, 302, and 303 involved in the instant messaging collaboration in the manner described herein.

In addition, users 301, 302, and 303 are able to annotate the data in real-time in order to make changes to the data or insert comments. As a user 301, for example, annotates the data, the annotated data is streamed in real-time to users 302 and 303 who are involved in the instant messaging collaboration via the proprietary server 350. Furthermore, users 302 and/or 303 may also make changes to the data in real-time, which may be streamed through the proprietary server 350 to the users 301, 302, and 303.

Another feature of the present invention allows for client computers that have pen-enabled data input. For example, a user 301 may circle a portion of the graphical report 306 with a pen-type device coupled to user's 301 client computer. This circle appears in real-time on users' 302 and 303 computer screens in accordance with one embodiment of the present invention. Spaces for pen-enabled entries 346, 383, and 393, such as handwriting recognition windows, may be located on users 301, 302, and 303 drop-down screens 340, 380, and 390. This feature permits instant messaging collaboration to be conducted using tablet personal computers where the main data entry device is not a keyboard but, a pen-type device.

Figure 4:
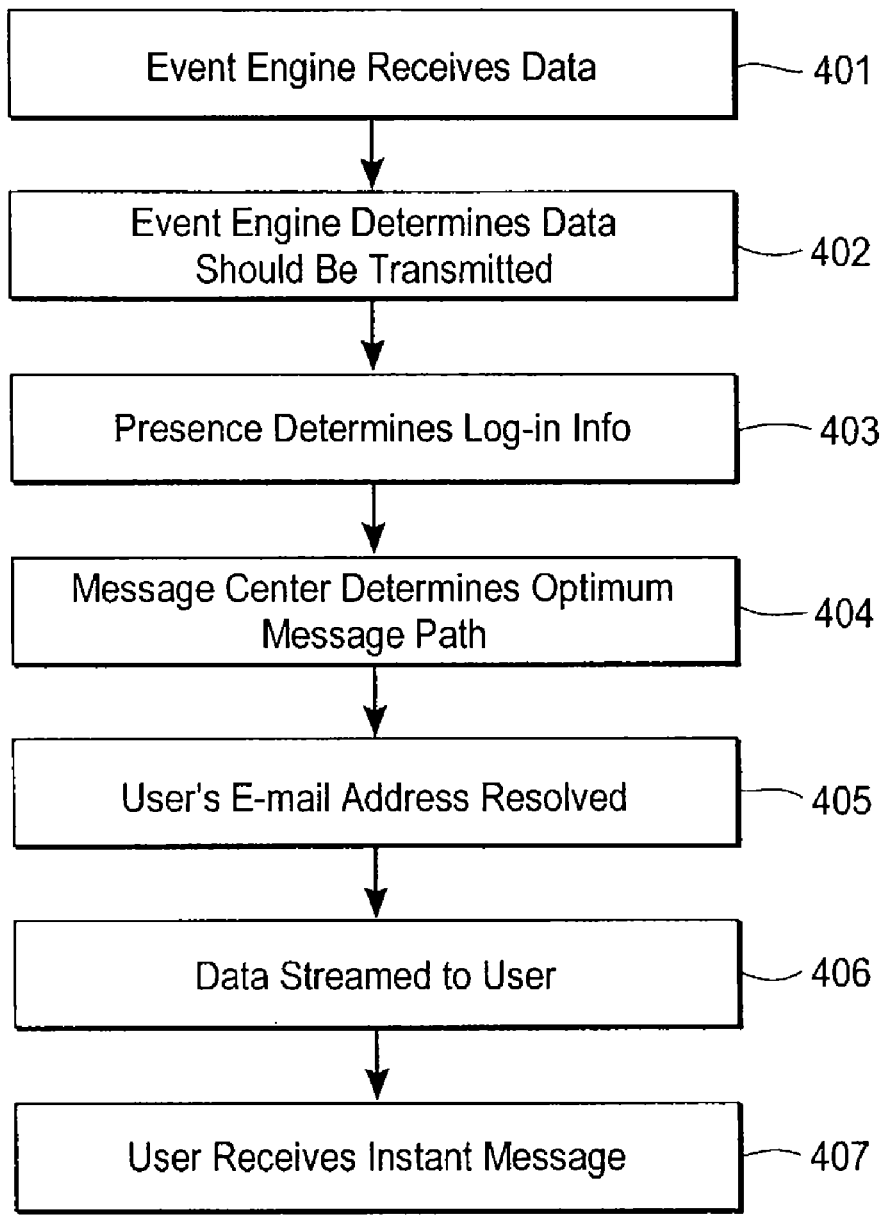
FIG. 4 is a flow chart illustrating the steps of an instant messaging process according to one embodiment of the present invention.

Referring now to FIG. 4, there is shown a flow chart illustrating the steps of an instant messaging process according to one embodiment of the present invention. An event engine receives data in the form of a graphical report from an ADC (block 401). The event engine determines that the data needs to be transmitted instantaneously to a user via the message center (block 402). The presence component of the message center determines that the user is logged on to the Microsoft instant messaging server and the proprietary server (block 403). The message center determines that the optimum path for the data is first through the proprietary server and second through the Microsoft instant messaging server (block 404). The user manager in the message center resolves the user's e-mail address (block 405). The data is streamed to the user in the form of an instant message through the proprietary server via the instant messaging protocol (block 406). The user successfully receives the data in real-time from the proprietary server (block 407).

Figure 5:
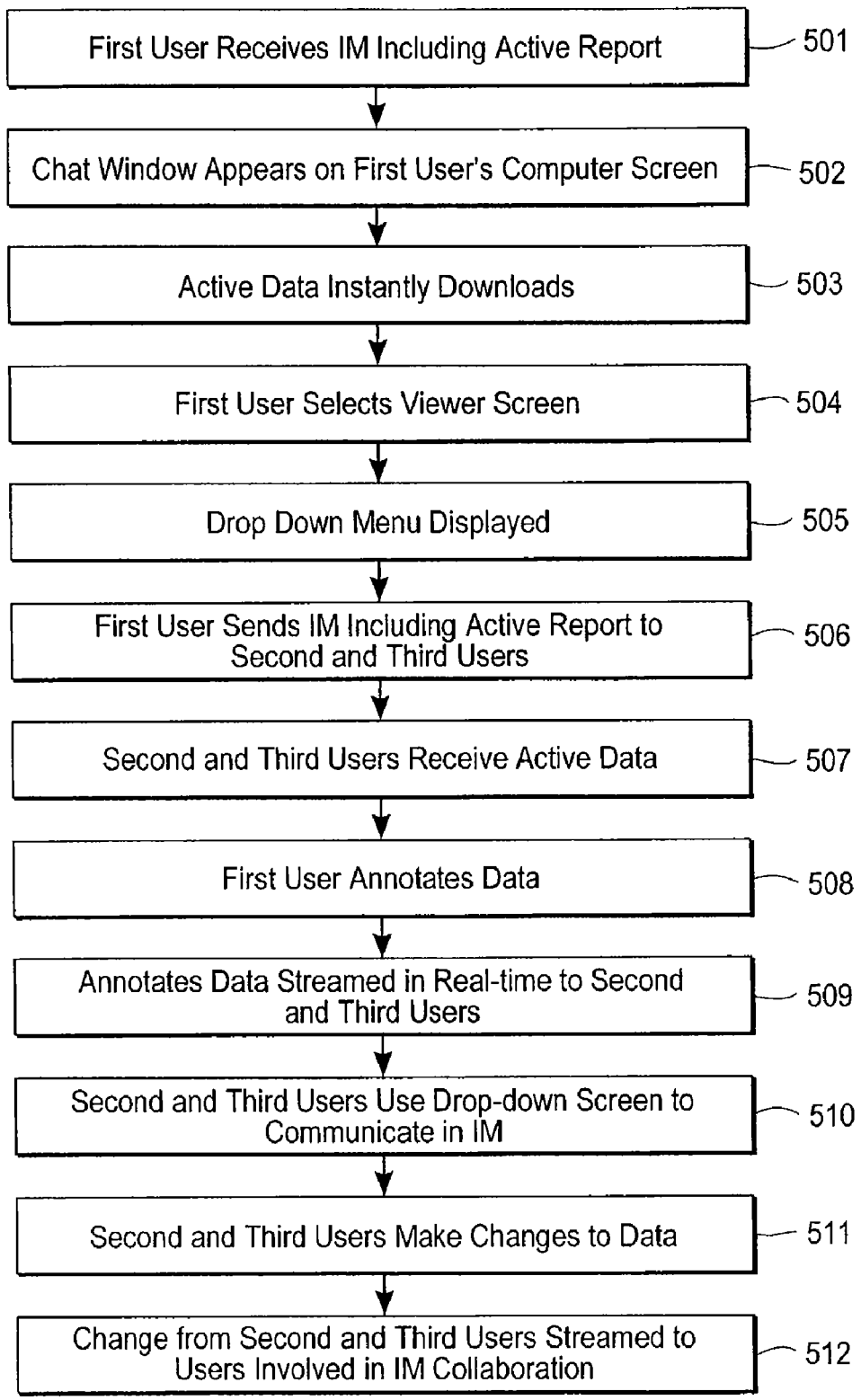
FIG. 5 is a flow chart illustrating the steps of an instant messaging collaboration process according to one embodiment of the present invention.

FIG. 5 is a flow chart illustrating the steps of an instant messaging collaboration process according to one embodiment of the present invention. A first user receives an instant message including an active report from the message center via the proprietary server (block 501). A chat window appears on the first user's client computer screen (block 502). The first user selects the chat window. Active data in the form of a sales report instantaneously downloads to the first user's computer screen (block 503).

In this example, the first user decides to share the sales report with a second and third user, and thus selects the viewer feature on the user's computer screen (block 504). A drop-down menu is displayed on the first user's computer screen (block 505). The first user utilizes a keypad to type in a message in the conversation window of the drop-down menu and sends this message as well as the sales report to the second and third users through the proprietary server using the instant messaging protocol (block 506).

Continuing with this example, the second and third users receive the exact data that is displayed on the first user's computer screen (block 507). The first user annotates the sales data by using a pen-type device to circle a portion of the data (block 508). This change in the data is instantaneously streamed in real-time to the second and third users (block 509) who are involved in an instant messaging collaboration via the proprietary server with the first user. The second and third users use drop-down menus on their respective computer screens to communicate with the users involved in the collaboration (block 510). The second and third users make changes to the active data report, pen-enabled or otherwise (block 511). These changes are streamed to the users involved in the instant messaging collaboration (block 512).

Figure 6:
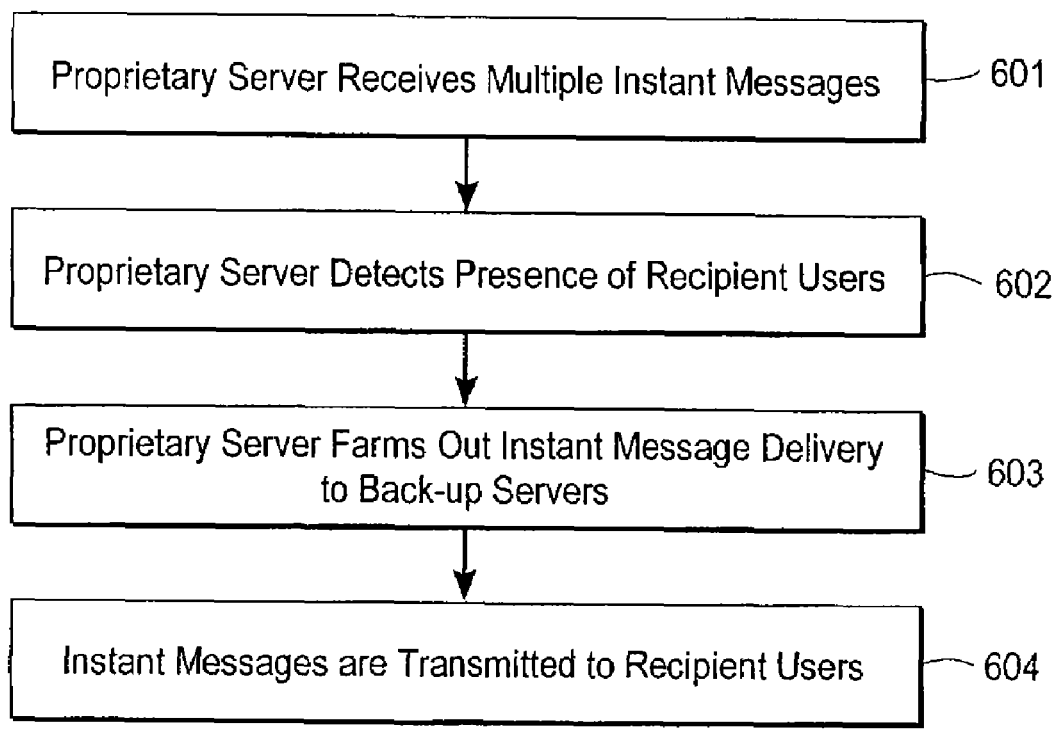
FIG. 6 is a flow chart illustrating one example operation according to one embodiment of the present invention.

A flow chart illustrating one example operation according to one embodiment of the present invention is shown in FIG. 6. A proprietary server receives from the message center multiple instant messages to be received by hundreds of recipient users (block 601). The proprietary server detects the presence of the recipient users who are logged on to the proprietary server (block 602). According to an algorithm contained within the proprietary server, the proprietary server farms out some of the instant messages to second, third, fourth, etc. back-up servers (block 603). The back-up servers transmit the instant messages to recipient users via a message component in the back-up servers (block 605).

Figure 7:
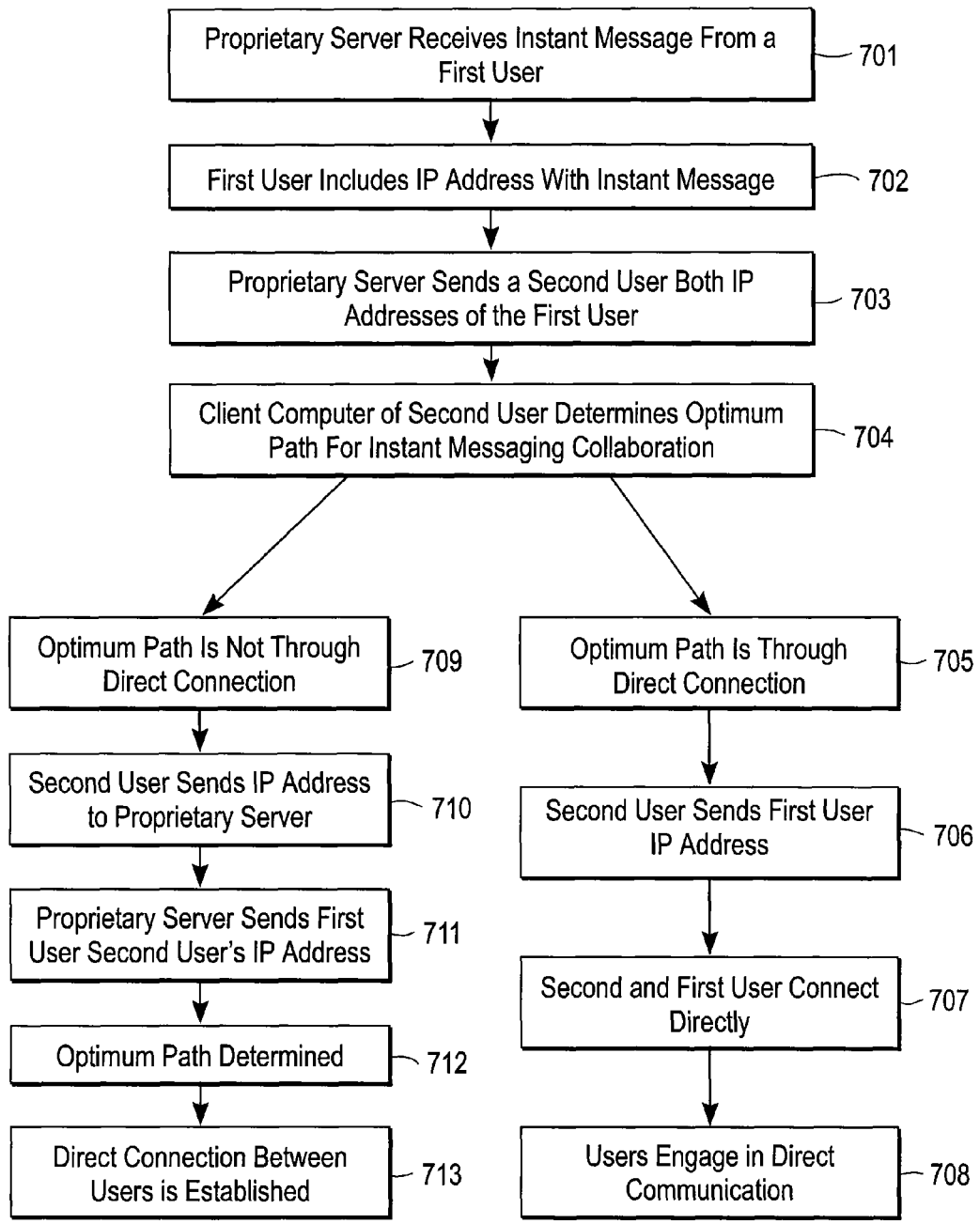
FIG. 7 is a flow chart illustrating the steps of a peer-to-peer instant messaging collaboration process according to one embodiment of the present invention.

FIG. 7 is a flow chart illustrating the steps of a peer-to-peer instant messaging collaboration process according to one embodiment of the present invention. A proprietary server receives an instant message from a first user for a second user (block 701). Since the IP address that the proprietary server has for the first user may be different than the IP address that a peer of the first user would use (because of Network Address Translation (NAT)), the first user also sends the proprietary server the IP address of his client computer along with the instant message (block 702). The proprietary server sends the second user both IP addresses of the first user (block 703). According to an algorithm contained within the client computer of the second user, the client computer determines an optimum path for instant messaging collaboration between the first user and the second user (block 704). If the second user determines the optimum path is through direct peer-to-peer collaboration (block 705), the second user sends the first user his IP address (block 706). The second user then connects to the first user directly via the IP address using the TCP/IP connection, completely bypassing the proprietary server (block 707). The users communicate directly, engaging in direct peer-to-peer instant messaging collaboration (block 708) via the TCP/IP connection. Alternatively, if the second user determines that he is unable to directly connect to the first user (block 709), the second user sends the IP address of his client computer to the proprietary server (block 710). The second user's IP address is passed to the first user via the proprietary server (block 711). According to an algorithm contained within the client computer of the first user, an optimum path for instant messaging collaboration is determined (block 712). If the optimum path is a direct connection, the first user and the second user connect directly via the IP address using the TCP/IP connection (block 713).

Figure 8:
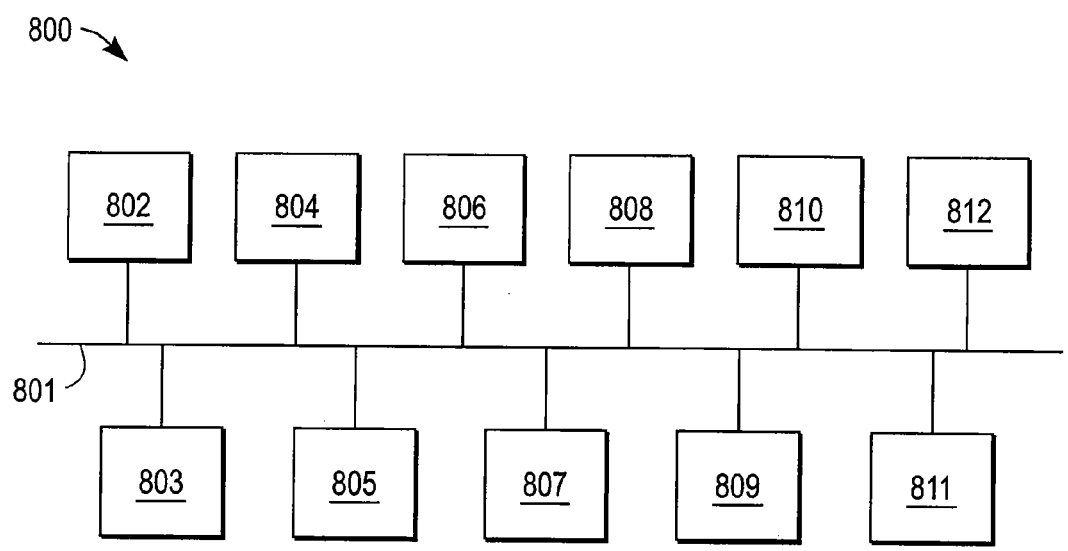
FIG. 8 illustrates a computer system according to one embodiment of the present invention.

Referring now to FIG. 8 there is shown a computer system 800 according to one embodiment of the present invention. The computer system 800 includes a processor 802 that executes a program that includes instructions that cause the algorithm to perform the steps of the invention. The processor 802 is coupled through a bus 801 to a random access memory (RAM) 803, a read only memory (ROM) 804, and a mass storage device 805. The ROM 804 may store the program to execute the steps of the invention. The RAM 803 may be used as an interim storage space for storing an instant message before it is transmitted to a user, or, for example, for storing an instant message before it is downloaded by a user, for example. Mass storage device 805 could be a disk or tape drive for storing data and instructions.

A display device 806 for providing visual output is also coupled to bus 801 for communicating information and command selections to processor 802. Keyboard 807 is coupled to bus 801 for communicating information and command selections to processor 802. Another type of input device is cursor control unit 808, which may be a device such as a mouse or trackball, for communicating direction commands that control cursor movement on display 809.

For example, the cursor control unit 808 may be used to click on a box that will display the instant messages and/or active data transmitted to the computer system 800. Yet another type of input device is a pen-type device 810, for making pen-enabled annotations to a document or for entering messages in handwriting recognition windows (not shown in this view) on drop-down menus on the display 809.

Processor 802 is shown coupled through bus 801 to an input/output (I/O) interface 811, which can be used to control and transfer data to electronic devices connected to computer 800, such as other computers, tape records, and the like.

Network interface device 812 is coupled to bus 801 and provides a physical and logical connection between computer system 800 and network medium, such as the Internet. Depending on the network environment in which computer 800 is used, this connection is typically to a server computer, but it can also be to a network router or to another client computer. Note that the architecture of FIG. 8 is provided only for purposes of illustration, and that a client computer is used in conjunction with the present invention is not limited to this specific architecture.

In the foregoing, a system and method for instant messaging collaboration has been described. Although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A method for conducting message transmission in a system that comprises an event engine coupled to an enterprise computing runtime environment and to a message center through a network, the method comprising:
    receiving raw enterprise data from a plurality of enterprise applications that are desired to be monitored;
    formatting the raw enterprise data received from the plurality of enterprise applications to create a message;
    transmitting the message to the event engine;
    receiving the message at the event engine over the network, the message containing data synchronized in real-time to data in the enterprise computing runtime environment, and the message generated according to a change in the data in the enterprise computing runtime environment;
    determining with the event engine whether the data is to be transmitted instantly to at least one user coupled to the message center via the network;

determining with at least one server coupled to the message center an optimum path for transmitting the data to the at least one user using a set of rules that identifies an order in which a proprietary instant message server, an external instant message server and an email transmission should be tried to contact the at least one user, wherein:
the external instant message server is accessed via the internet by the at least one server as a peer; and
the proprietary instant message server is accessed via an in-house connection; and
sending a message containing the data to the at least one user through the at least one server coupled to the message center through the network using the determined optimum path.

2. The method of claim 1 further comprising tracking a logon state of the at least one user.

3. The method of claim 1 further comprising:
maintaining a list of users that includes the at least one user in the message center that are eligible for communication by instant message transmission; and
resolving an e-mail address associated with the one or more users from the list of users.

4. The method of claim 1 wherein the optimum path is provided through a mail server.

5. The method of claim 1 wherein the optimum path is provided through a MicrosoftQY instant messaging server.

6. The method of claim 1 wherein the optimum path is provided through a proprietary server.

7. The method of claim 6 further comprising providing encryption for the message transmission through the proprietary server.

8. The method of claim 6 wherein the proprietary server allows for the farming out of instant message transmission to back-up servers, the back-up servers providing for message transmission to the one or more users.

9. The method of claim 1 further comprising:
establishing a direct connection to the at least one user; and
sending the message to the at least one user via the direction connection.

10. The method of claim 1, wherein the changes are made utilizing a pen-type device.

11. The method of claim 1 wherein the network is a Transmission Control Protocol/Internet Protocol (TCP/IP) network.

12. The method of claim 1 wherein the network includes the Internet.

13. The method of claim 1, wherein determining with the least one server coupled to the message center the optimum path for transmitting the data to the at least one user is further based on a presence of the at least one user.

14. A system comprising:
a network;
an enterprise link engine, configured to:
receive raw enterprise data from a plurality of enterprise applications that are desired to be monitored;
format the raw enterprise data received from the plurality of enterprise applications to create a message; and
transmit the message to the event engine;
an event engine coupled with the network, the event engine configured to:
receive the message over the network, the message containing data synchronized in real-time to data in an enterprise computing runtime environment, and the message generated according to a change in the data in the enterprise computing runtime environment, and
determine whether the data is to be transmitted instantly to at least one user coupled to the message center via the network; and
at least one server of a message center, coupled with the network, configured to:
determine an optimum path for transmitting the data to the at least one user using a set of rules that identifies an order in which a proprietary instant message server, an external instant message server and an email transmission should be tried to contact the at least one user, wherein:
the external instant message server is accessed via the internet by the at least one server as a peer; and
the proprietary instant message server is accessed via an in-house connection; and
send a message containing the data to the at least one user through the at least one server coupled to the message center through the network using the determined optimum path.

15. A machine-readable memory having stored thereon instructions which, when executed by a processor, cause the processor to:
receive raw enterprise data from a plurality of enterprise applications that are desired to be monitored;
format the raw enterprise data received from the plurality of enterprise applications, wherein the formatted raw enterprise data is synchronized in real-time to data in an enterprise computing runtime environment, and the data indicates a change in data of the enterprise computing runtime environment;
determine whether the data is to be transmitted instantly to at least one user;
determine an optimum path for transmitting the data to the at least one user using a set of rules that identifies an order in which a proprietary instant message server, an external instant message server and an email transmission should be tried to contact the at least one user, wherein:
the external instant message server is accessed via the internet by the at least one server as a peer; and
the proprietary instant message server is accessed via an in-house connection; and
send a message containing the data to the at least one user using the determined optimum path.

* * * * *

UNITED STATES PATENT AND TRADEMARK OFFICE
CERTIFICATE OF CORRECTION

PATENT NO.      : 8,402,095 B2  
APPLICATION NO. : 12/039471  
DATED           : March 19, 2013  
INVENTOR(S)     : Beauchamp et al.

It is certified that error appears in the above-identified patent and that said Letters Patent is hereby corrected as shown below:

Title Page

On page 4, in column 1, under "Other Publications", line 41-42, delete "ILOC View 2D Graphics : The C++ Library for Interactive 2D Graphics," ILOG".

On page 4, in column 1, under "Other Publications", line 43, delete "Sametime 3 Features and Benefits" IBM".

On page 4, in column 2, under "Other Publications", line 51, delete "Microsoft Excel Print Screen Images (figs. 1-6)".

On page 4, in column 2, under "Other Publications", line 71, delete "Unuversity," and insert -- University, --, therefor.

On page 5, in column 1, under "Other Publications", line 5, delete "Institutue" and insert -- Institute --, therefor.

On page 5, in column 1, under "Other Publications", line 29, delete "Exhange," and insert -- Exchange, --, therefor.

Signed and Sealed this  
Sixteenth Day of July, 2013

Teresa Stanek Rea  
*Acting Director of the United States Patent and Trademark Office*